US010711512B2

(12) United States Patent
Bouesnard et al.

(10) Patent No.: US 10,711,512 B2
(45) Date of Patent: Jul. 14, 2020

(54) GLAZED ELEMENT WITH IMPROVED TIGHTNESS

(71) Applicant: AGC GLASS EUROPE, Louvain-la-Neuve (BE)

(72) Inventors: Olivier Bouesnard, Ittre (BE); Nicolas Chorine, Haasrode (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 16/340,221

(22) PCT Filed: Oct. 2, 2017

(86) PCT No.: PCT/EP2017/074993
§ 371 (c)(1),
(2) Date: Apr. 8, 2019

(87) PCT Pub. No.: WO2018/069083
PCT Pub. Date: Apr. 19, 2018

(65) Prior Publication Data
US 2020/0040643 A1   Feb. 6, 2020

(30) Foreign Application Priority Data
Oct. 11, 2016 (EP) ..................... 16193293

(51) Int. Cl.
*E06B 3/56* (2006.01)
*E06B 3/02* (2006.01)
(Continued)

(52) U.S. Cl.
CPC ............... *E06B 3/56* (2013.01); *E06B 3/025* (2013.01); *E06B 3/308* (2013.01); *E06B 2003/6247* (2013.01)

(58) Field of Classification Search
CPC . E06B 3/025; E06B 3/308; E06B 3/56; E06B 2003/6247
See application file for complete search history.

(56) References Cited

U.S. PATENT DOCUMENTS 3,020,605 A * 2/1962 Di Lemme ........... E06B 3/6205
49/437
4,104,427 A * 8/1978 Nolte ...................... C03C 27/10
428/68

(Continued)

FOREIGN PATENT DOCUMENTS

CH          694 132 A5    7/2004
DE      196 54 748 A1    7/1998

OTHER PUBLICATIONS

Machine Translation of CH 694132 (Year: 2019).*

(Continued)

*Primary Examiner* — James M Ference
(74) *Attorney, Agent, or Firm* — Oblon, McClelland, Maier & Neustadt, L.L.P.

(57) ABSTRACT

The present invention relates to a glazed element with improved water tightness comprising a fixed frame, at least one gasket $G_a$ and at least one frameless inwardly openable casement wherein the casement comprises a multiple glazing comprising in external position a glass pane including at least one thermally treated glass sheet, the glass pane has an overall bow on at least its bottom edge of at most 3.0 mm/m and the gasket $G_a$ is such that it is in continuous contact with the fixed frame and with at least the bottom edge of the glass pane, when the glazed element is in closed position.

18 Claims, 3 Drawing Sheets

(51) Int. Cl.
   *E06B 3/30* (2006.01)
   *E06B 3/62* (2006.01)

(56) References Cited

U.S. PATENT DOCUMENTS

| | | | | |
|---|---|---|---|---|
| 4,608,796 | A * | 9/1986 | Shea, Jr. | E06B 1/36 52/204.595 |
| 4,668,556 | A * | 5/1987 | Hermann | E06B 3/56 428/122 |
| 4,847,977 | A * | 7/1989 | Gold | B60J 10/70 29/446 |
| 4,894,972 | A * | 1/1990 | Endoh | B29C 45/14377 296/146.15 |
| 4,944,984 | A * | 7/1990 | Kunert | B60J 1/17 24/564 |
| 5,061,531 | A * | 10/1991 | Catalano | E06B 3/20 156/107 |
| 5,158,638 | A * | 10/1992 | Osanami | B29C 45/14336 156/108 |
| 5,333,428 | A * | 8/1994 | Taylor | B44C 5/08 264/254 |
| 6,270,605 | B1 * | 8/2001 | Doerfler | B32B 17/10036 156/102 |
| 6,401,428 | B1 * | 6/2002 | Glover | E06B 3/24 52/786.1 |
| 6,647,914 | B1 * | 11/2003 | Gerhardinger | B63B 19/02 114/361 |
| 8,490,345 | B2 * | 7/2013 | Fields | E05B 65/462 49/371 |
| 8,595,994 | B1 * | 12/2013 | Grommesh | E06B 3/66304 52/171.3 |
| 2004/0168387 | A1 * | 9/2004 | Nelson | E06B 1/62 52/344 |
| 2006/0101734 | A1 * | 5/2006 | Fischer | E06B 3/56 52/202 |
| 2006/0260229 | A1 * | 11/2006 | McKinlay | E06B 3/22 52/204.593 |
| 2007/0056231 | A1 * | 3/2007 | DiMario | B60J 1/00 52/204.53 |
| 2007/0188059 | A1 * | 8/2007 | Davis | E06B 3/7001 312/265.6 |
| 2008/0210361 | A1 * | 9/2008 | Bohm | B29C 43/12 156/102 |
| 2009/0047509 | A1 * | 2/2009 | Gagliardi | C03C 17/36 428/336 |
| 2009/0324858 | A1 * | 12/2009 | Jaeger | E06B 3/6617 428/34 |
| 2010/0230543 | A1 * | 9/2010 | Bruce | B05B 12/26 244/129.3 |
| 2014/0026502 | A1 * | 1/2014 | Carbary | E04B 2/90 52/235 |
| 2015/0047275 | A1 * | 2/2015 | McCarthy | B64C 1/14 52/204.51 |
| 2016/0095450 | A1 * | 4/2016 | Trulaske, Sr. | A47F 11/10 312/116 |

OTHER PUBLICATIONS

Machine Translation of DE 19654748 (Year: 2019).*
International Search Report dated Oct. 30, 2017 in PCT/EP2017/074993 filed Oct. 2, 2017.

* cited by examiner

GLAZED ELEMENT WITH IMPROVED TIGHTNESS

FIELD OF THE INVENTION

The present invention relates to glazed elements such as a glass window, glass door, glass wall, glass façade or the like having an improved tightness to water when frameless casements comprising thermally treated glass sheets are used.

BACKGROUND OF THE INVENTION

Glazed elements such as a glass window, a glass door, a glass wall, a glass façade or the like separating the interior from the exterior of buildings are usually designed and built with a fixed frame, at least one openable casement and one or several sealing means also called gaskets which obstruct the space between the fixed frame and the openable casement of the glazed element, to prevent water penetration.

As the glazed elements are generally intended to be used in building envelopes, residential or not, a safety glass may be suitable to ensure protection of people from injuries and fall. It is especially the case when the glazed elements have large dimensions. Safety glasses are for instance thermally treated glasses or laminated glasses.

The thermal treatment of the glass sheets can generate large scale deformation. In standard glazed elements comprising thermally treated glass sheets, the deformation is not an issue because the gaskets are located between the fixed frame and frame elements of the openable casement. On the contrary, in the case of a frameless glazed element wherein some or all frame elements of the openable casement are absent, one or several glass sheets of the casement can be in direct contact with the gaskets and the deformation might be an issue in terms of water tightness.

Furthermore, glass sheets used in frameless applications generally comprise an enamel layer on the periphery to mask elements such as the hardware means. The enamel requires a thermal treatment to be fired. The periphery of the glass sheet being different, it will hence react differently from the rest of the sheet upon thermal treatment leading to increased deformation with regards to glass sheets that are homogeneous on their faces. The glass sheets used in frameless applications generally also comprise low-emissivity or solar control coatings to improve the insulating performances, which are edge deleted. When both an enamel peripheral layer and an edge deleted coating are used, the glass sheet periphery is even more different from the rest of the glass sheet.

This combination of elements makes the contact between the gaskets and the thermally treated glass sheets more difficult. Water tightness is hence challenging for frameless glazed elements.

Objectives of the Invention

It is an objective of the present invention to provide a glazed element comprising an openable frameless casement having an improved water tightness.

It is an objective of the present invention to provide a glazed element comprising an openable frameless casement having an improved water tightness for instance as measured according to EN 12208:1999 and EN 1027:2016.

It is also an objective of the present invention to provide a glazed element comprising an openable frameless casement having an improved water tightness while not significantly impacting the aesthetics of the glazed element.

It is another objective of the present invention to provide a glazed element comprising an openable frameless casement having an improved water tightness while keeping a low force to close the glazed element.

It is another objective of the present invention to provide a glazed element comprising an openable frameless casement having an improved water tightness and safety function.

It is another objective of the present invention to provide a glazed element comprising an openable frameless casement having an improved water tightness and high thermal insulation performances.

It is another objective of the present invention to provide a glazed element comprising an openable frameless casement having an improved water tightness and acoustic performances.

It is another objective of the present invention to provide a glazed element comprising several openable frameless casements having the above advantages.

SUMMARY OF THE INVENTION

To this end, the invention relates to a glazed element comprising a fixed frame, at least one gasket $G_a$ and at least one frameless inwardly openable casement, the casement comprises a multiple glazing comprising in external position a glass pane including at least one thermally treated glass sheet, the gasket $G_a$ extends along the periphery of the casement and is located between the external face of the glass pane and the fixed frame, wherein the glass pane has an overall bow on its bottom edge of at most 3.0 mm/m, measured according to EN 1863-1:2011, the gasket $G_a$ is such that it is in continuous contact with the fixed frame and the bottom edge of the glass pane, when the glazed element is in closed position.

By glazed element is meant a glass window, a glass door, a glass wall, a glass façade and the like.

The glazed element of the invention comprises a fixed frame, which is the continuous component that is fastened to the bearing structure of the building and is not movable. The fixed frame is usually made of wood, metal, plastic, composite materials or a combination of them.

The glazed element of the invention also comprises at least one frameless inwardly openable casement. The openable casement is the openable component which is connected to the fixed frame through hardware means, and fills the opening defined by the fixed frame. The hardware means include all the devices, fittings, or assemblies, necessary to operate the inwardly openable casement as intended. The casement has generally a square or rectangular shape. The casement is a frameless casement, i.e. a casement having a higher transparent surface than a standard one by elimination of some or all the frame elements of the casement or some frame elements are invisible because masked by glass sheet. The casement can be any sliding casement, any tilt and/or turn casement, which opens towards the interior of the building.

The casement comprises a multiple glazing comprising in external position a glass pane including at least one thermally treated glass sheet. The glass pane in external position is the one having a face in contact with the exterior of the building. The glass pane may either be a single thermally treated glass sheet or a laminated glass comprising at least one thermally treated glass sheet.

The thermally treated glass sheet has been treated by any thermal treatment known by the skilled person such as heat strengthening (according to EN 1863-1:2011), thermal toughening (according to EN 12150-2:2015) or thermal toughening and heat soaking (according to EN 14179-2:2005). The glass sheet thermally treated according to these standards is suitable as safety glass. The glass sheet to be thermally treated can be chosen among all glass technologies, among them: float clear, extra-clear or colored glass, (partially) acid etched or (partially) sand blasted glass and combinations thereof. This sheet is preferably partially coated. By partially coated is meant that a part of their surface is coated with a low-emissivity or a solar control coating or enameled or combinations thereof. In an embodiment, the glass sheet to be thermally treated is enameled on its periphery to allow masking elements such as the hardware means of the frameless casement. In another embodiment, the glass sheet has a low-emissivity or a solar control coating to improve the thermal insulation performances, which is edge deleted. In a preferred embodiment, the glass sheet is enameled on its periphery and has an edge deleted low-emissivity or a solar control coating.

A laminated glass usually consists of two or more glass sheets assembled by a polymeric film, such as polyvinylbutyral (PVB), ethylenevinylacetate (EVA), thermoplastic polyurethanes (TPU) or ionoplast interlayer such as SentryGlas®. In case of breakage, glass pieces remain attached to the polymeric film, avoiding people injuries, and maintaining the separation active. Laminated glasses are suitable as safety glasses and bring acoustic performances. The laminated glass according to the invention comprises at least one thermally treated glass sheet as described supra. The one or optionally more other glass sheets of the laminated glass and of the multiple glazing can be chosen among all glass technologies, among them: float clear, extra-clear or colored glass, optionally with a low-emissivity or a solar control coating, acid etched or sand blasted glass (or partially), optionally thermally treated and/or laminated, glass products with dynamic properties, so-called active glass, such as electro-chromic glass, painted (or partially painted) glass and combinations thereof.

The multiple glazing is preferably a double or a triple glazing.

Any interspace defined between two glass sheets or between a glass sheet and a laminated glass of the multiple glazing may additionally be filled with dry air or an inert gas, such as argon or krypton, or by a mixture of them to reduce the heat exchange and improve the thermal insulation performances.

A glazed element generally comprises one or several gaskets to ensure sufficient water tightness performances. The gaskets are for instance made of a durable and elastic material such as a natural or synthetic rubber. The gaskets can either be plain or hollow. The glazed element of the invention comprises a first gasket $G_a$ that extends along the periphery of the casement and is located between the external face of the glass pane and the fixed frame. By external face of the glass pane is meant the face in contact with the exterior of the building. The gasket $G_a$ can be fastened to the fixed frame or to the glass pane. It is preferably fastened to the fixed frame. It is advantageous in applications where the aesthetics of the glazed element, particularly in open position, is of interest.

The glass pane of the invention is a single thermally treated glass sheet or a laminated glass comprising the same.

In both cases, the glass pane is not flat because of the deformation of the thermally treated glass sheet upon thermal treatment. The deformation may be more severe when the thermally treated glass sheet is enameled on its periphery and/or comprises a low-emissivity or a solar control coating that is edge deleted. Indeed, in these cases where the periphery is different from the rest of the glass sheet the deformation caused by the thermal treatment is higher. In the case of the laminated glass, the deformation of the thermally treated glass sheet is partially offset by the lamination.

The glass pane of the invention comprising a thermally treated glass sheet has an overall bow on its bottom edge of at most 3.0 mm/m, measured according to EN 1863-1:2011 and the gasket $G_a$ is such that it is in continuous contact with the fixed frame and the bottom edge of the glass pane, when the glazed element is in closed position. By bottom edge of the glass pane is meant the lower edge of the glass pane. It is the edge where water tends to accumulate and where water tightness is the most critical. By continuous contact is meant that the contact between the gasket $G_a$, the fixed frame and the bottom edge of the glass pane is not interrupted when the glazed element is in closed position, so that there is no open space for water to infiltrate. The shape and dimensions of the gasket $G_a$ are such that the contact with the fixed frame and the bottom edge of the glass pane is not interrupted. The shape and dimensions of the gasket $G_a$ may advantageously be also such that they do not significantly impact the aesthetics of the glazed element.

The standard EN 1863-1:2011 relates to the flatness tolerances of heat strengthened monolithic soda lime silicate glass for use in buildings. It requires a maximum overall bow of 5.0 mm/m for glass sheets to be compliant and usable in building applications, but makes no link between the flatness requirements and water tightness of glazed elements comprising the glass sheets. It is understandable as in standard glazed elements the gaskets are located between the fixed frame and frame elements of the openable casement and no direct contact between the gasket and the glass sheet exists. This standard is herein used to characterize the deformation of the glass pane of the invention.

The standard requires a maximum overall bow of 5.0 mm/m for a monolithic heat strengthened glass sheet to comply with the flatness requirements. However, a maximum value of 3.0 mm/m of the glass pane is needed to ensure a sufficient tightness for a glazed element according to the invention wherein gasket $G_a$ is located between the external face of the glass pane and the fixed frame The glazed element of the invention has an improved water tightness. It has for instance an improved water tightness as measured according to EN 12208:1999 (classification) and EN 1027:2016 (test conditions). Furthermore, the reduced bow advantageously requires less deformation of gasket $G_a$ to be in continuous contact with the fixed frame and the bottom edge of the glass pane when closing the glazed element and less force is needed to close the glazed element.

The overall bow is preferably at most 2.8 mm/m, more preferably at most 2.5 mm/m.

Such a reduced bow can be obtained by optimizing the thermal treatment parameters such as to allow the glass sheet to reach a substantially homogeneous temperature upon treatment, i.e. to have a limited temperature gradient between the edges of the glass sheet and its center. The parameters have to be optimized on a case by case basis depending on the specificities of the furnace. A parameter of interest is the residence time of the glass sheet in the furnace, which has to be increased to allow the glass sheet temperature to homogenize. The residence time increase has to be optimized taking into account the production efficiency.

In an embodiment of the present invention, the glass pane has an overall bow on side edges of at most 3.0 mm/m measured according to EN 1863-1:2011 and the gasket $G_a$ is in continuous contact with the fixed frame and with the side edges of the glass pane, when the glazed element is in closed position. The side edges of the glass pane are those edges that are separated by the bottom edge of the glass pane. When the glazed element is in vertical position, the side edges are the vertical edges. The reduced bow on the side edges and the continuous contact of the gasket $G_a$ with the fixed frame and with same side edges in addition to the bottom edge further improve the water tightness of the glazed element and further helps to maintain the force needed to close the glazed element at a reasonable level.

The overall bow is preferably at most 2.8 mm/m, more preferably at most 2.5 mm/m.

In another embodiment of the present invention, the glazed element comprises a second gasket $G_b$. The gasket $G_b$ extends all along the fixed frame, is in continuous contact with the fixed frame and with the casement and is located inwardly with respect to the gasket $G_a$. The gasket $G_b$ can be fastened to the fixed frame or to the glass pane. It is preferably fastened to the fixed frame. It is advantageous in applications where the aesthetics of the glazed element, particularly in open position, is of interest. The gasket $G_b$ comprises a part which is designed as a lip generally oriented towards the casement, and which comes in contact with said casement. Gasket $G_b$ is generally not visible when the glazed element is closed. The shape and dimensions of the lip can hence be more flexibly designed to tightly obstruct the space between the fixed frame and the casement than those of gasket $G_a$ The shape and dimensions of gasket $G_a$ are indeed advantageously chosen such that they do not significantly impact the aesthetics or transparent surface of the glazed element.

Gasket $G_b$ is in continuous contact with the fixed frame and the casement along its entire length and is air and water tight. It is located inwardly with respect to gasket $G_a$, meaning that it is in a position in the casement closer to the interior of the building than gasket $G_a$. Gaskets $G_a$ and $G_b$ define between them a peripheral interspace running between the fixed frame and the casement. In severe rain conditions, some water might infiltrate the interspace. Because gasket $G_b$ is air and water tight, gasket $G_a$ is in non continuous contact with the fixed frame and the top edge of the glass pane to allow the infiltrated water to evacuate the glazed element for instance through draining means. By non continuous contact is meant that the contact between the gasket $G_a$, the fixed frame and the top edge of the glass pane is interrupted at one or several places. Would gasket $G_a$ be in continuous contact with the glass pane and the fixed frame along its entire length, the evacuation of water would create a depression in the interspace preventing extra water to evacuate. $G_a$ is in non continuous contact with the fixed frame and the top edge of the glass pane because the risk of water accumulation is the weakest at the top edge.

In a variant of this embodiment, the gasket $G_b$ is in contact with the fixed frame and a glass sheet of the multiple glazing of the casement that is different from the glass pane in exterior position.

In this embodiment, and variant, the non continuous contact can be an interruption of contact due to the deformation of the glass pane on the top edge where the bow is not subject to the limitation of at most 3.0 mm/m. The non continuous contact can alternatively be obtained by the use of a non continuous gasket $G_a$ on this edge, i.e. gasket $G_a$ on this edge is made of several non contiguous portions.

In yet another embodiment of the invention, the gasket $G_a$ is fastened on the fixed frame and comprises at least one deformable lip oriented towards the center of the glazed element, when the glazed element is in closed position. The fastening of the gasket $G_a$ on the fixed frame allows the presence of a deformable lip that will come in contact with the glass pane when the casement is in closed position. This would not be possible in the case the gasket would be fastened to the glass pane. The lip has a shape and dimensions such that it will deform and allow the gasket to adapt to the shape of the glass pane edges that have a bow of at most 3.0 mm/m in an easier way. Furthermore, the shape and dimensions of the gasket $G_a$ with a deformable lip are preferably such that they do not significantly impact the aesthetics of the glazed element. The shape and dimensions of the gasket $G_a$ may also advantageously ease the evacuation of water towards the exterior of the glazed element and keep the force needed to close the glazed element at a reasonable level. The shape and dimensions advantageously provide a good balance between the aesthetics aspects, the water evacuation and the force to close the casement.

In the cases where the deformation is more important, for instance when the thermally treated glass sheet is partially coated or for large size glazed elements, the presence of a gasket with a deformable lip in addition to reduced bow is of particular interest to improve the water tightness. Alternatively, the reduced bow can be combined with a glass pane that is a laminated glass as the lamination will partly offset the deformation of the thermally treated glass sheet. It is also possible to combine a reduced bow, a gasket with a deformable lip and a glass pane that is a laminated glass.

The present invention also relates to a glazed element comprising a fixed frame, a gasket $G_a$ and at least two frameless inwardly openable casements $C_a$ and $C_b$ with no mullion between them, each casement comprises a multiple glazing comprising in external position a glass pane including at least one thermally treated glass sheet, the gasket $G_a$ extends along the periphery of the fixed frame and is located between the external face of each glass pane and the fixed frame, wherein, each glass panes has an overall bow on its bottom edge of at most 3.0 mm/m, measured according to EN 1863-1:2011.

the gasket $G_a$ is such that it is in continuous contact with the fixed frame and the bottom edges of each glass pane, when the glazed element is in closed position, a gasket $G_c$ is fastened to the vertical edge of casement $C_a$ contiguous to casement $C_b$, the glass pane of casement $C_b$ has an overall bow on its vertical edge contiguous to casement $C_a$ of at most 3.0 mm/m, measured according to EN 1863-1:2011, and the gasket $G_c$ is such that it is in continuous contact with said vertical edge of the glass pane of casement $C_b$ and the contiguous vertical edge of casement $C_a$.

In this case, all the features previously described similarly apply. In this configuration, at least two casements as previously described are used with no mullion between them, i.e. with no vertical fixed frame element between them. The configuration also implies that another side edge different from the previous side edges is present on each casement at the junction with an adjacent casement.

A consequence of the absence of mullion, the gasket $G_a$ that extends along the periphery of the fixed frame is absent at the level of the vertical junction between the casements. A gasket $G_c$ is fastened at this level, it is fastened to the vertical edge of casement $C_a$ that is contiguous to casement $C_b$.

The glass pane of casement $C_b$ has an overall bow on its vertical edge contiguous to casement $C_a$ of at most 3.0 mm/m, measured according to EN 1863-1:2011, and the gasket $G_c$ is such that it is in continuous contact with said vertical edge of the glass pane of casement $C_b$ and the contiguous vertical edge of casement $C_a$.

Such glazed element has an improved water tightness. It has for instance an improved water tightness as measured according to EN 12208:1999 and EN 1027:2016. Furthermore, the reduced bow advantageously requires less deformation of gaskets $G_a$ and $G_c$ to be in continuous contact with the fixed frame and the bottom edge of the glass panes when closing the glazed element and less force is needed to close the glazed element.

In an embodiment of this configuration, a gasket $G_d$ is fastened to the vertical edge of casement $C_b$ contiguous to casement $C_a$. When the glazed element is in closed position, the gasket $G_d$ is in continuous contact with casement $C_a$ and it is located inwardly with respect to gasket $G_c$. In this closed position, the gaskets $G_b$ and $G_d$ are in contact and form a water and air tight barrier. As described supra, the evacuation of water infiltrated in the glazed element is possible because the gasket Ga is in non continuous contact with the fixed frame and the top edge of each glass pane.

In a variant of this embodiment, the gasket $G_b$ is in continuous contact all along the fixed frame with said fixed frame and a glass sheet of the multiple glazing of each casement $C_a$ and $C_b$ different from the glass pane in external position, and the gasket $G_d$ is in continuous contact with the same glass sheet of casement $C_a$. $G_d$ is hence in continuous contact between casement $C_b$ and that said glass sheet of $C_a$.

All other embodiments and variants of the glazed element comprising at least one frameless inwardly openable casement described supra similarly apply to the glazed element comprising at least two frameless inwardly openable casements.

The invention will be better understood upon reading the following description in view of the attached figures that are in no way limiting the scope of the invention.

SHORT DESCRIPTION OF THE DRAWINGS

DETAILED DESCRIPTION

Figure 1:
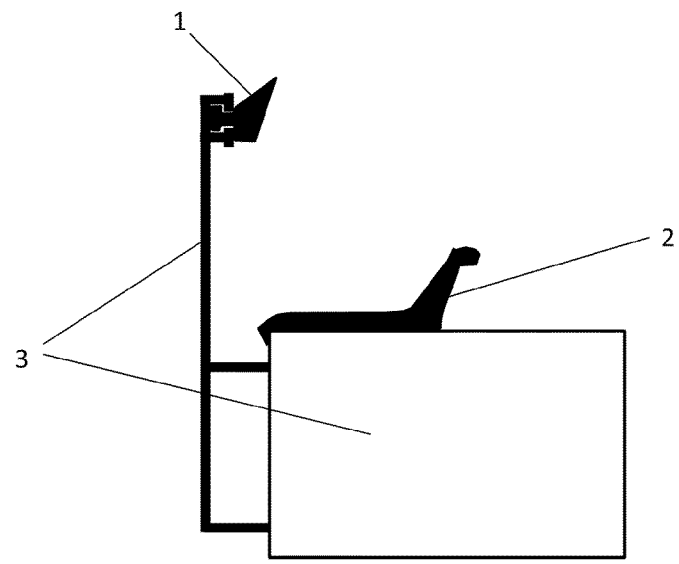
FIG. 1 is a cross-sectional view of a bottom edge of the fixed frame of a glazed element according to a first embodiment of the invention where the glazed element is in open position.

FIG. 1 represents a cross sectional view of the bottom edge of a glazed element in open position. It shows a fixed frame 3, a gasket $G_a$ 1 and a gasket $G_b$ 2. Gasket $G_a$ 1 is here fastened to the fixed frame 3 and has a deformable lip. The shape and dimensions of gasket $G_a$ 1 illustrated presents a good balance between the aesthetics aspects, the water evacuation and the force to close the casement. Gasket $G_b$ 2 is significantly bigger than $G_a$ as it is invisible when the glazed element is in closed position. It is inwardly located with regards to gasket $G_a$.

Figure 2:
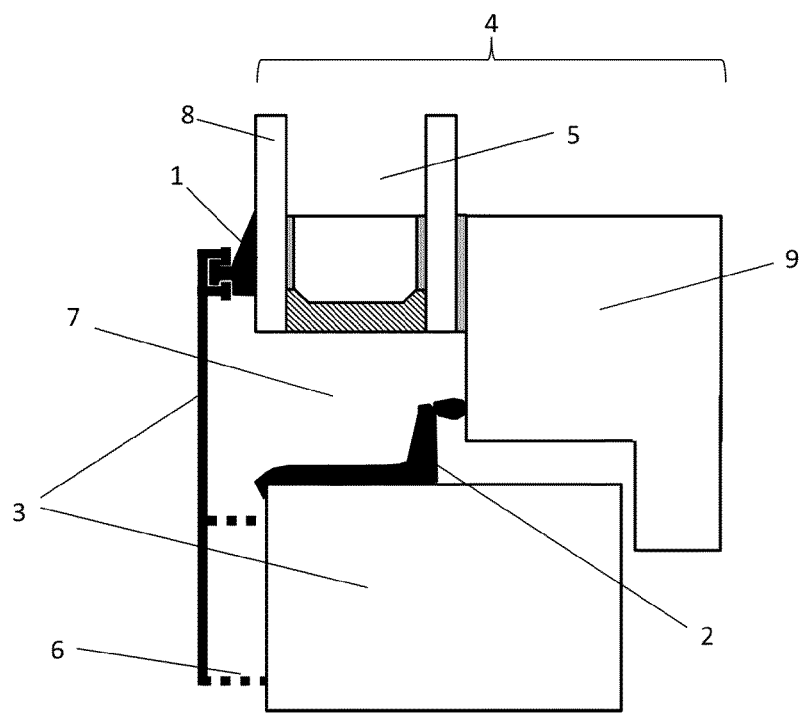
FIG. 2 shows a cross-sectional view of the bottom edge of a glazed element according to the embodiment of FIG. 1 where the glazed element is in closed position and the glass pane of the casement in external position is a thermally treated glass sheet.

FIG. 2 represents a cross sectional view of the bottom edge of a glazed element in closed position. It shows namely the same elements as in FIG. 1. The bottom edge of the fixed frame 3 comprises a draining system 6. The inwardly openable casement 4 at its bottom edge has no frame element on the side towards the exterior of the building and has a frame element 9 on the side towards the interior of the building. It comprises a double glazing 5 with a glass pane 8 in external position consisting of a single thermally treated glass sheet. The gasket $G_a$ 1 is in continuous contact with the fixed frame 3 and the bottom edge of the glass sheet 8. The gasket $G_b$ 2 is in continuous contact with the fixed frame 3 and with the frame element 9 of the casement 4. Gaskets $G_a$ 1 and $G_b$ 2 define between them a peripheral interspace 7 running between the fixed frame 3 and the casement 4.

Figure 3:
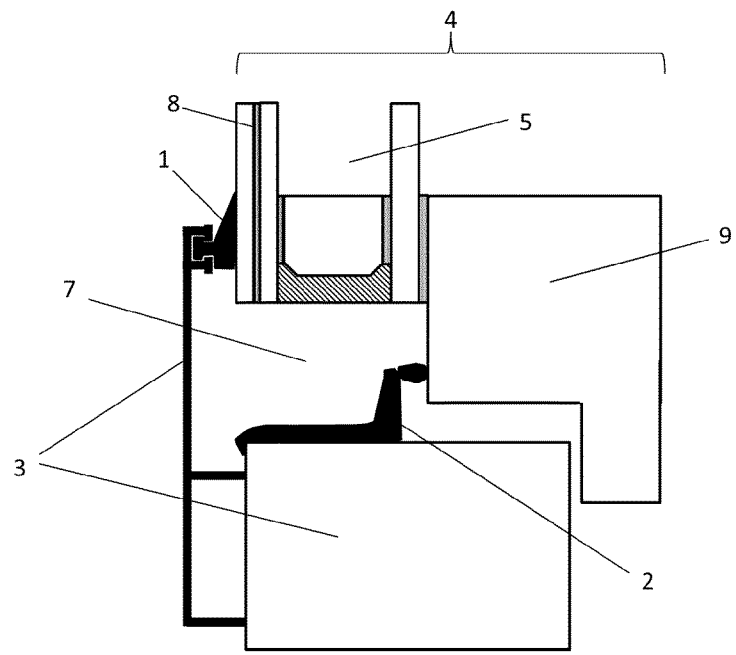
FIG. 3 shows a cross sectional view of a bottom edge of a glazed element according to another embodiment of the invention where the glazed element is in closed position and the glass pane is a laminated glass comprising one thermally treated glass sheet.

FIG. 3 represents a cross sectional view of the bottom edge of a glazed element showing the same elements as in FIG. 2, but the glass pane 8 consists of a laminated glass comprising one thermally treated glass sheet and another glass sheet separated by a polymeric film.

Figure 4:
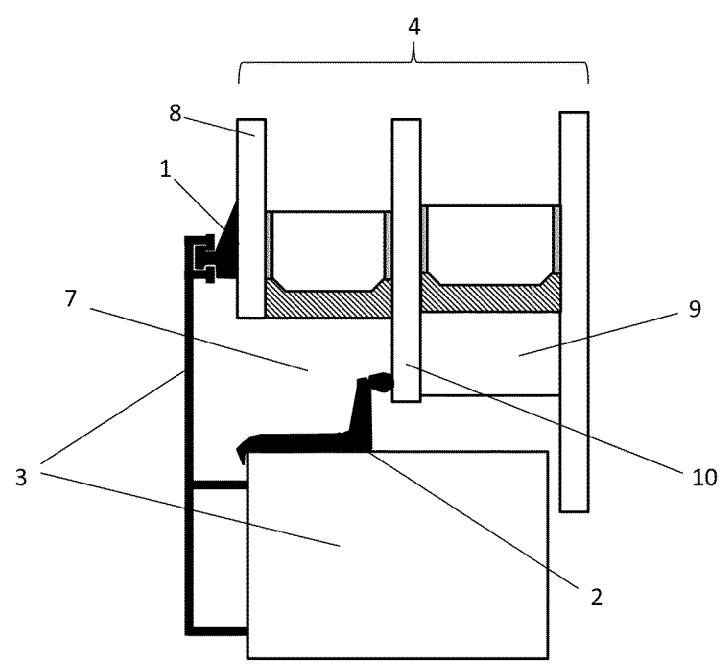
FIG. 4 shows a cross sectional view of a bottom edge of a glazed element according to another embodiment of the invention where the glazed element is in closed position, the glass pane in external position is a thermally treated glass sheet and gasket $G_b$ is in contact with a glass sheet of the triple glazing of the casement.

FIG. 4 represents a cross sectional view of the bottom edge of a glazed element where the inwardly openable casement 4 has a frame element 9 at its bottom edge, which is invisible when the glazed element is in closed position. It comprises a triple glazing with a glass pane 8 in external position consisting of a single thermally treated glass sheet. The gasket $G_b$ 2 is in continuous contact with the fixed frame 3 and a glass sheet 10 of the multiple glazing of the casement 4.

Figure 5:
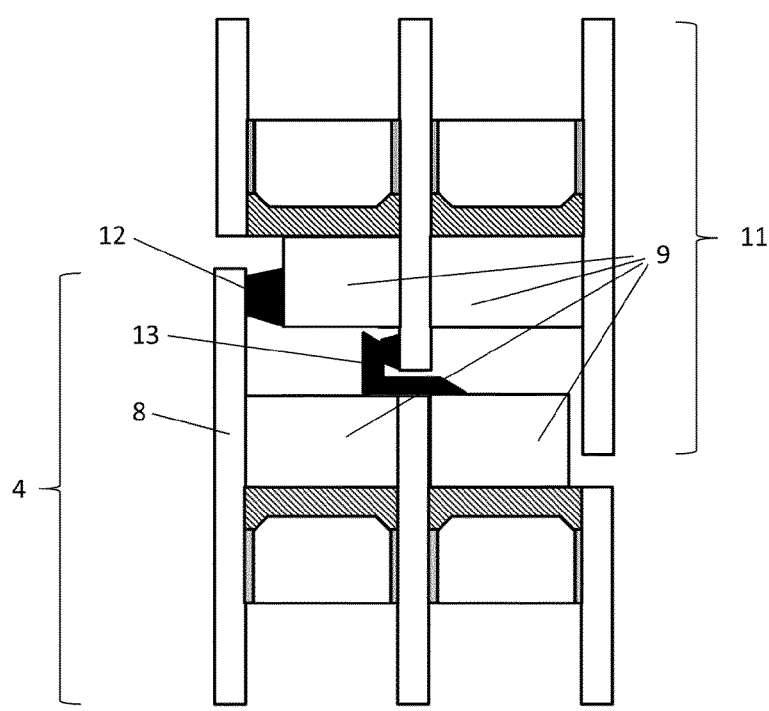
FIG. 5 shows a cross sectional view of the vertical junction between two casements of a glazed element according to the invention where the glazed element is in closed position.

FIG. 5 represents a cross sectional view of the vertical junction between two casements 4 and 11 in closed position, which have no mullion between them, but frame elements 9 are present between the glass sheets. The exterior glass pane 8 of casement $C_b$ 4 is a thermally treated glass sheet. The gasket $G_c$ 12 is fastened to a frame element 9 of the vertical edge of casement $C_a$ 11 which is contiguous to casement $C_b$ 4. The gasket $G_c$ 12 is in continuous contact with the vertical edge of casement $C_a$ 11 and the glass pane 8 of casement $C_b$ 4. The gasket $G_d$ 13 is fastened to the vertical edge of casement $C_b$ 4 contiguous to casement $C_a$ 11. When the glazed element is in closed position, gasket $G_d$ 13 is in continuous contact with a glass sheet of casement $C_a$ 11 and is located inwardly with respect to gasket $G_c$ 12.

The invention claimed is:
1. A glazed element for a building comprising a fixed frame, at least one gasket $G_a$ and at least one frameless inwardly openable casement,
wherein the casement comprises a multiple glazing comprising an external glass pane configured to face an exterior of the building comprising at least one thermally treated glass sheet, the gasket $G_a$ extends along a periphery of the casement and is located between an external face of the glass pane and the fixed frame, the glass pane has an overall bow on a bottom edge of the glass pane of at most 3.0 mm/m, measured according to EN 1863-1:2011, and the gasket $G_a$ is such that the gasket $G_a$ is in continuous contact with the bottom edge of the glass pane and a portion of the fixed frame contiguous to the bottom edge of the glass pane, when the glazed element is in a closed position.

2. The glazed element according to claim 1, wherein the glass pane is a single thermally treated glass sheet.

3. The glazed element according to claim 1, wherein the glass pane is a laminated glass comprising the at least one thermally treated glass sheet.

4. The glazed element according to claim 1, wherein the thermally treated glass sheet is at least partially coated.

5. The glazed element according to claim 1, wherein,
the glass pane has an overall bow on side edges of the glass pane of at most 3.0 mm/m, measured according to EN 1863-1:2011, and the gasket $G_a$ is such that the gasket $G_a$ is in continuous contact with the side edges of the glass pane and with portions of the fixed frame contiguous to side edges of the glass pane, when the glazed element is in the closed position.

6. The glazed element according to claim 1, comprising a gasket $G_b$, which extends along the fixed frame, is in continuous contact with the casement and is located inwardly with respect to the gasket $G_a$ and, the gasket $G_a$ is in non-continuous contact with a top edge of the glass pane and a portion of the fixed frame contiguous to the top edge of the glass pane.

7. The glazed element according to claim 6, wherein the gasket $G_b$ is in continuous contact with the fixed frame and an interior glass sheet of the multiple glazing of the casement.

8. The glazed element according to claim 6, wherein the gasket $G_a$ is non-continuous between the top edge of the glass pane and the portion of the fixed frame contiguous to the top edge.

9. The glazed element according to claim 1, wherein the gasket $G_a$ is fastened to the fixed frame and comprises at least one deformable lip oriented towards a center of the glazed element, when the glazed element is in the closed position.

10. A glazed element for a building comprising a fixed frame, a gasket $G_a$ and at least two frameless inwardly openable casements $C_a$ and $C_b$ with no mullion between them,
wherein
each casement comprises a multiple glazing comprising an external glass pane configured to face an exterior of the building including at least one thermally treated glass sheet, the gasket $G_a$ extends along a periphery of the fixed frame and is located between an external face of each glass pane and the fixed frame, each glass pane has an overall bow on a bottom edge of the glass pane of at most 3.0 mm/m, measured according to EN 1863-1:2011, the gasket $G_a$ is such that the gasket $G_a$ is in continuous contact with a bottom edge of each glass pane and a portion of the fixed frame contiguous to the bottom edge of each glass plane, when the glazed element is in a closed position, a gasket $G_c$ is fastened to a vertical edge of casement $C_a$ contiguous to casement $C_b$, the glass pane of casement $C_b$ has an overall bow on a vertical edge of the glass pane contiguous to casement $C_a$ of at most 3.0 mm/m, measured according to EN 1863-1:2011, and the gasket $G_c$ is such that the gasket $G_c$ is in continuous contact with said vertical edge of the glass pane of casement $C_b$ and a contiguous vertical edge of casement $C_a$.

11. The glazed element according to claim 10, wherein the glass panes are single thermally treated glass sheets.

12. The glazed element according to claim 10, wherein the glass panes are laminated glasses comprising the at least one thermally treated glass sheet.

13. The glazed element according to claim 10, wherein the thermally treated glass sheet is at least partially coated.

14. The glazed element according to claim 10, wherein,
each glass pane has an overall bow on side edges of the glass pane contiguous to the fixed frame of at most 3.0 mm/m, measured according to EN 1863-1:2011, and the gasket $G_a$ is such that the gasket $G_a$ is in continuous contact with side edges of each glass pane that are contiguous to the fixed frame and portions of the fixed frame contiguous to the side edges of each glass pane, when the glazed element is in the closed position.

15. The glazed element according to claim 10, comprising a gasket $G_b$ that is in continuous contact with the fixed frame and each casement all along the fixed frame and is located inwardly with respect to the gasket $G_a$, a gasket $G_d$ is fastened to the vertical edge of casement $C_b$ contiguous to casement $C_a$ and when the glazed element is in a closed position, gasket $G_d$ is in continuous contact with casement $C_a$ and located inwardly with respect to gasket $G_c$,
wherein
gaskets $G_b$ and $G_d$ are in contact with each other when the glazed element is in the closed position and,
the gasket $G_a$ is in non-continuous contact with a top edge of each glass pane and a portion of the fixed frame contiguous to the top edge of each glass pane.

16. The glazed element according to claim 15, wherein the gasket $G_a$ is non-continuous between the top edge of each glass pane and a portion of the fixed frame contiguous to the top edge of each glass pane.

17. The glazed element according to claim 10, wherein the gasket $G_b$ is in continuous contact all along the fixed frame with said fixed frame and an interior glass sheet of the multiple glazing of each casement $C_a$ and $C_b$, and the gasket $G_d$ is in continuous contact with the interior glass sheet of casement $C_a$.

18. The glazed element according to claim 10, wherein the gasket $G_a$ is fastened to the fixed frame and comprises at least one deformable lip oriented towards a center of the glazed element, when the glazed element is in closed position.

* * * * *